(12) United States Patent
Furushige et al.

(10) Patent No.: US 9,361,305 B2
(45) Date of Patent: Jun. 7, 2016

(54) IMAGE FORMING APPARATUS HAVING A FILE SYSTEM

(75) Inventors: Katsuji Furushige, Osaka (JP); Kyoichiro Hayashi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 389 days.

(21) Appl. No.: 13/570,613

(22) Filed: Aug. 9, 2012

(65) Prior Publication Data

US 2013/0038906 A1 Feb. 14, 2013

(30) Foreign Application Priority Data

Aug. 9, 2011 (JP) ................................. 2011-174391
Aug. 9, 2011 (JP) ................................. 2011-174392

(51) Int. Cl.
*G06F 12/00* (2006.01)
*G06F 17/30* (2006.01)
*G06K 15/00* (2006.01)

(52) U.S. Cl.
CPC ............................... *G06F 17/30091* (2013.01)

(58) Field of Classification Search
CPC ... G06K 15/02; G06F 17/30067; G06F 13/10; G06F 12/109; G06F 12/1027; G06F 17/30091; G06F 12/08; G06F 12/10; G06F 12/1054; G06F 12/1063; G06F 12/1081; G06F 13/18; G06F 13/30; G06F 9/52; G06F 9/526; G06F 12/0292; G06F 12/0246; G06F 12/0284; G06F 3/067
USPC ........... 358/1.16, 1.11–1.18; 710/1–5, 22–28, 710/240–244; 711/6, 100–105, 173, 711/200–210, 150, 151
See application file for complete search history.

(56) References Cited

U.S. PATENT DOCUMENTS

| 6,615,291 | B1 * | 9/2003 | Kamei | G06F 13/30 710/22 |
|---|---|---|---|---|
| 2003/0177332 | A1 * | 9/2003 | Shiota | G06F 12/109 711/203 |
| 2004/0177261 | A1 * | 9/2004 | Watt | G06F 9/30181 713/193 |
| 2008/0082780 | A1 * | 4/2008 | Tsuji | G06F 12/0653 711/171 |
| 2008/0209203 | A1 * | 8/2008 | Haneda | G06F 21/72 713/150 |
| 2009/0033993 | A1 * | 2/2009 | Nakazato et al. | 358/1.15 |
| 2010/0153749 | A1 * | 6/2010 | Sakai | G06F 21/6236 713/193 |
| 2010/0169573 | A1 * | 7/2010 | Tsuji | G06F 3/0611 711/114 |
| 2010/0220359 | A1 * | 9/2010 | Ohgishi | G06F 9/5016 358/1.16 |
| 2011/0161620 | A1 * | 6/2011 | Kaminski | G06F 12/1009 711/207 |
| 2011/0225378 | A1 * | 9/2011 | Hara | H04N 1/32561 711/155 |

FOREIGN PATENT DOCUMENTS

| JP | 2003-316646 A | 11/2003 |
|---|---|---|
| JP | 2005-149368 A | 6/2005 |
| JP | 2010-020540 | 1/2010 |
| JP | 2010020540 A * | 1/2010 |

* cited by examiner

*Primary Examiner* — Chad Dickerson
(74) *Attorney, Agent, or Firm* — McDonnell Boehnen Hulbert & Berghoff LLP

(57) ABSTRACT

An image forming apparatus includes a main storage unit; an auxiliary storage unit; a file system configured to manage a file stored in the auxiliary storage unit; and an input-output processing unit configured to use an area in the main storage unit to perform file access to a file in the file system. The area is in a storage area that is not managed by an operating system and the area is specified with a physical address in an instruction from a user process.

8 Claims, 5 Drawing Sheets

IMAGE FORMING APPARATUS HAVING A FILE SYSTEM

REFERENCE TO RELATED APPLICATIONS

This application is based upon and claims the benefit of priority from the corresponding Japanese Patent Application Nos.: 2011-174391, filed in the Japan Patent Office on Aug. 9, 2011, and 2011-174392, filed in the Japan Patent Office on Aug. 9, 2011, the entire contents of which are incorporated herein by reference.

BACKGROUND

1. Technical Field

The present disclosure relates to an image forming apparatus having a file system.

2. Description of the Related Art

Typical image forming apparatuses have image data partitions and image attribute data partitions separated from each other. The image data and the image attribute data are managed in separate files in different file systems in the respective partitions. Non-operating system (OS) management domains in main storage units are used for file access to the image data, and OS management domains in the main storage units are used for file access to the image attribute data.

Since each file system normally has one file access method fixed thereto, the file access is performed to one file system by a predetermined method.

SUMMARY

An image forming apparatus according to an embodiment of the present disclosure includes a main storage unit, an auxiliary storage unit, a file system, and an input-output processing unit. The file system is configured to manage a file stored in the auxiliary storage unit. The input-output processing unit is configured to use an area in the main storage unit to perform file access to a file in the file system. The area is in a storage area that is not managed by an operating system and the area is specified with a physical address in an instruction from a user process.

A non-transitory computer-readable recording medium according to an embodiment of the present disclosure stores a file access program executable by a computer in an image forming apparatus. The file access program includes first program code that when executed by the computer causes the computer to manage a file stored in an auxiliary storage unit; and second program code that when executed by the computer causes the computer to use an area in a main storage unit to perform file access to a file in a file system. The area is in a storage area that is not managed by an operating system and the area is specified with a physical address in an instruction from a user process.

An image forming apparatus according to an embodiment of the present disclosure includes a main storage unit, an auxiliary storage unit, a file system, a first input-output processing unit, and a second input-output processing unit. The file system is configured to manage a file stored in the auxiliary storage unit. The first input-output processing unit is configured to use a storage area in the main storage unit to perform file access to a file in the file system if a first mode is specified in an instruction from a user process. The storage area is managed by an operating system. The second input-output processing unit is configured to use a storage area in the main storage unit to perform the file access to a file in the file system if a second mode is specified in an instruction from the user process. The storage area is not managed by the operating system.

A non-transitory computer-readable recording medium according to an embodiment of the present disclosure stores a file access program executable by a computer in an image forming apparatus. The file access program includes first program code that when executed by the computer causes the computer to manage a file stored in an auxiliary storage unit; and second program code that when executed by the computer causes the computer to use a storage area in a main storage unit to perform file access to a file in a file system if a first mode is specified in an instruction from a user process. The storage area is managed by an operating system. The file access program also includes third program code that when executed by the computer causes the computer to use a storage area in the main storage unit to perform the file access to a file in the file system if a second mode is specified in an instruction from the user process. The storage area is not managed by the operating system.

Additional features and advantages are described herein, and will be apparent from the following Detailed Description and the figures.

DETAILED DESCRIPTION

Embodiments of the present disclosure will be described herein with reference to the attached drawings.

1. First Embodiment

Figure 1:
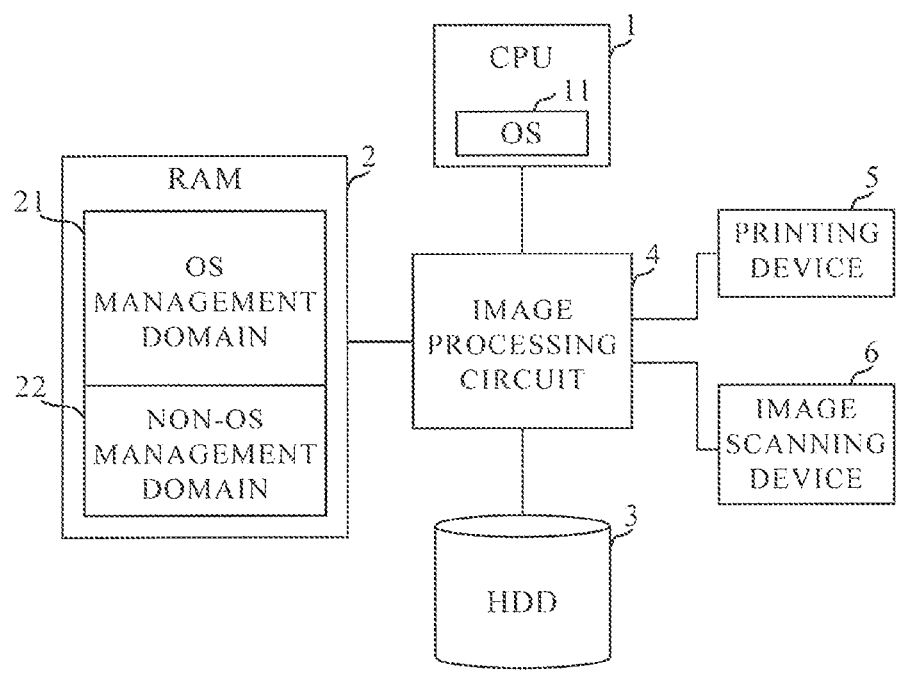
FIG. 1 shows an example configuration of an image forming apparatus according to a first embodiment of the present disclosure.

FIG. 1 shows an example of the configuration of an image forming apparatus according to a first embodiment of the present disclosure. Referring to FIG. 1, image forming apparatus includes central processing unit (CPU) 1, random access memory (RAM) 2, hard disk drive 3, image processing circuit 4, printing device 5, and image scanning device 6.

CPU 1 is a processor that executes various programs. For example, CPU 1 executes programs in an operating system (OS) and executes an application program as a user process. OS 11 operates as the operating system of the image forming apparatus in CPU 1.

RAM 2 is a dynamic random access memory (DRAM), such as a double-data-rate synchronous DRAM (DDR-SDRAM), and serves as a main storage unit for CPU 1.

Part of the storage area on RAM 2 is used as OS management domain 21. OS management domain 21 is managed by OS 11 (can be used by OS 11). Another part of the storage area on RAM 2, an area excluding OS management domain 21, is used as non-OS management domain 22.

A virtual address is allocated to OS management domain 21. The user process specifies the virtual address to access OS management domain 21 via OS 11.

A virtual address may be allocated to non-OS management domain 22, and the user process may specify the virtual address to access non-OS management domain 22 via OS 11.

Alternatively, the user process may specify a physical address to access non-OS management domain 22 via OS 11 without allocating a virtual address to non-OS management domain 22.

Hard disk drive 3 serves as an auxiliary storage unit. Files managed in a file system in OS 11 are stored in hard disk drive 3. Image data or image attribute data is stored in each file.

Image processing circuit 4 is connected to CPU 1 and is an application specific integrated circuit (ASIC) including an image processor that performs image processing (not shown), a memory controller connected to RAM 2 (not shown), and an interface used for access to hard disk drive 3 (not shown).

For example, the image processor in image processing circuit 4 reads out the image data (or the image data and the image attribute data) specified by the user process from RAM 2 to perform the image processing specified by the user process. In addition, the image processor writes the image data (or the image data and the image attribute data) processed by the image processor into RAM 2.

Printing device 5 receives the processed image data from image processing circuit 4 and prints an image based on the processed image data. Image scanning device 6 optically scans an original image to generate the image data and the image attribute data related to the original image and supplies the image data and the image attribute data to image processing circuit 4.

Figure 2:
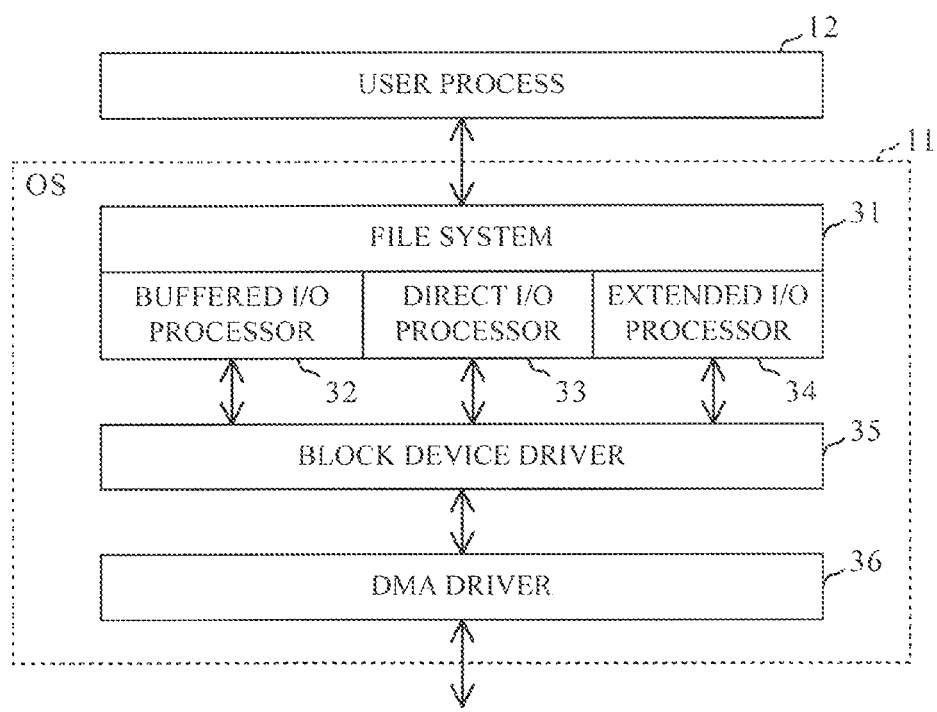
FIG. 2 shows an example of the configuration of a part concerning file access in an OS in FIG. 1.

FIG. 2 shows an example configuration of a part concerning file access in OS 11 in FIG. 1. As shown in FIG. 2, in OS 11, requests for file access to a file in file system 31 (a file open request, a file close request, a read request, and a write request) from user process 12 are received by file system 31 and are processed by any of buffered input-output (I/O) processor 32, direct I/O processor 33, and extended I/O processor 34.

File system 31 manages the files stored in hard disk drive 3. Buffered I/O processor 32, direct I/O processor 33, and extended I/O processor 34 in file system 31 each use the storage area on RAM 2 to cause the memory controller in image processing circuit 4 to execute reading from and writing into hard disk drive 3 with block device driver 35 and direct memory access (DMA) driver 36.

Figure 3A:
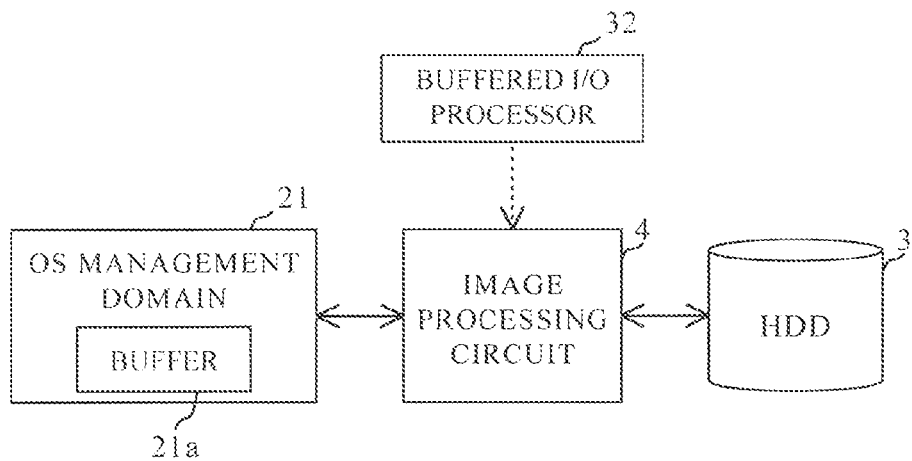
FIG. 3A shows an example of how file access is performed by a buffered I/O processor as shown in FIG. 2.
Figure 3B:
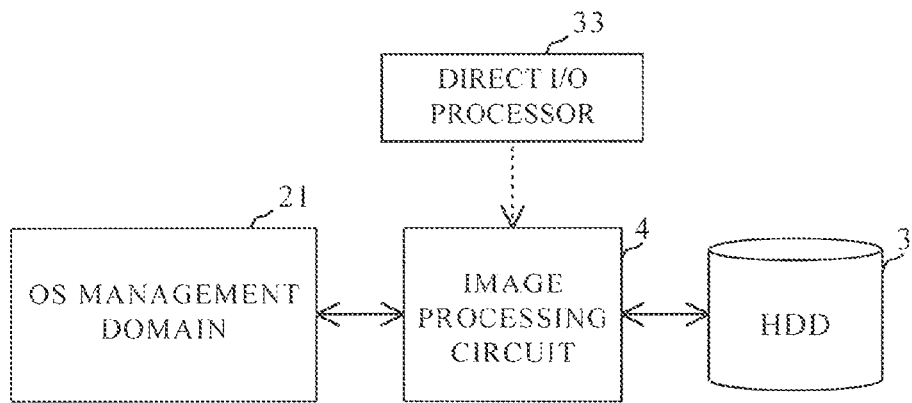
FIG. 3B shows an example of how the file access is performed by a direct I/O processor as shown in FIG. 2.
Figure 3C:
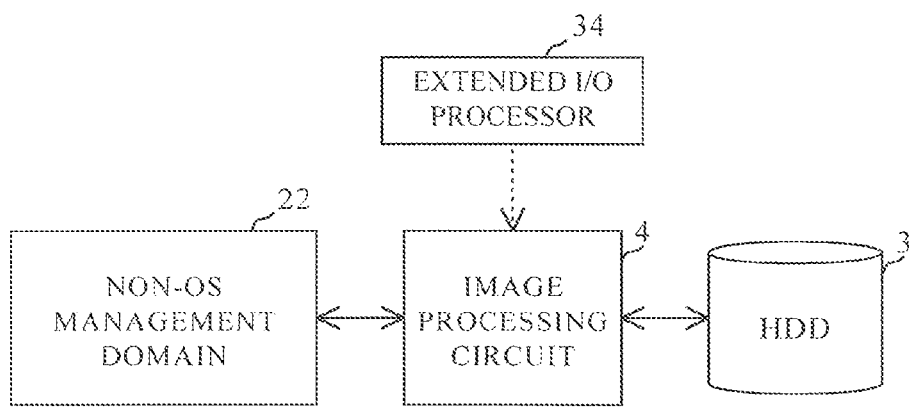
FIG. 3C shows how the file access is performed by an extended I/O processor as shown in FIG. 2.

FIGS. 3A to 3C show how the file access is performed by buffered I/O processor 32, direct I/O processor 33, and extended I/O processor 34 in FIG. 2.

If a buffered I/O mode is specified in an instruction from the user process, buffered I/O processor 32 uses OS management domain 21 to perform the file access to a file in the file system in the buffered I/O mode. Specifically, as shown in FIG. 3A, buffered I/O processor 32 accesses the hard disk drive 3 under a specific condition while temporarily storing data to be read or written in buffer 21a provided in OS management domain 21. This allows access to the data at high speed if the data to be read or written exists in buffer 21a. However, if data with a large size, such as the image data, is continuously input and output, the data overflows from buffer 21a and the access to the hard disk drive frequently occurs. Accordingly, accessing data at a high speed should not be expected.

If a direct I/O mode is specified in an instruction from the user process, direct I/O processor 33 uses OS management domain 21 to perform the file access to a file in the file system in the direct I/O mode. Specifically, as shown in FIG. 3B, direct I/O processor 33 executes reading or writing of the data stored in OS management domain 21 from or into hard disk drive 3, but not via buffer 21a.

The storage area (in OS management domain 21) of the data to be read or written is specified with its virtual address for buffered I/O processor 32 and direct I/O processor 33. This virtual address is converted into a physical address by the OS on the basis of, for example, a page table. The DMA driver specifies the storage area on the RAM with the physical address.

If an extended I/O mode is specified in an instruction from the user process, extended I/O processor 34 uses non-OS management domain 22 to perform the file access to a file in the file system in the extended I/O mode. Specifically, as shown in FIG. 3C, extended I/O processor 34 executes reading or writing of the data stored in non-OS management domain 22 from or into the hard disk drive 3, but not via buffer 21a.

If the virtual address is allocated to non-OS management domain 22, the virtual address is associated with the corresponding physical address by straight mapping. In this case, the storage area (in non-OS management domain 22) of the data to be read or written is specified with its virtual address for extended I/O processor 34. This virtual address is converted into a physical address by address conversion by extended I/O processor 34. The DMA driver specifies the storage area on the RAM with the physical address.

If no virtual address is allocated to non-OS management domain 22, the storage area (in non-OS management domain 22) of the data to be read or written is specified with its physical address by the user process. Extended I/O processor 34 notifies the DMA driver of the physical address, and the DMA driver specifies the storage area on the RAM with the physical address.

Figure 4:
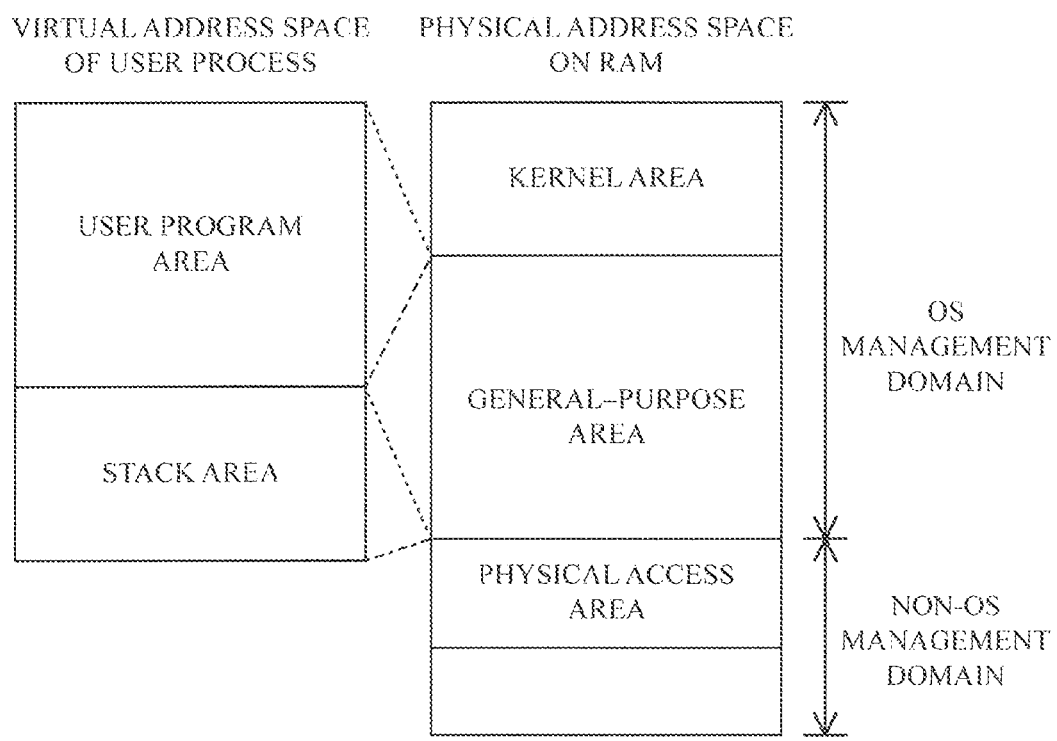
FIG. 4 shows the correspondence between a virtual address space of a user process in FIG. 2 and a physical address space on a RAM.

FIG. 4 shows the correspondence between a virtual address space of user process 12 in FIG. 2 and a physical address space on the RAM. As shown in FIG. 4, the OS management domain in the RAM includes a kernel area of the OS and a general-purpose area, and the virtual address space (a user program area and a stack area) of the user process is mapped onto the general-purpose area. A physical access area in the non-OS management domain, which is a domain other than the OS management domain, is used as an area for the data processed by the extended I/O processor.

If the file access by the extended I/O processor competes with the file access by the buffered I/O processor or the direct I/O processor in the first embodiment, the file access by the extended I/O processor has priority over the file access by the buffered I/O processor or the direct I/O processor.

For example, among the image data and the image attribute data, the image data is read from or written into one file on the file system by the extended I/O processor. In contrast, the image attribute data is read from or written into another file on the file system by the buffered I/O processor or the direct I/O processor. Accordingly, the image data and the image attribute data are capable of being managed on the same file system.

An operation of the image forming apparatus described above will now be described.

Upon activation of the image forming apparatus, the OS is started. Then, an application program is executed as the user process. In the user process, the CPU and the image processing circuit perform a variety of processing to the data in the OS management domain or the non-OS management domain.

If a file access instruction occurs in the user process 12, the I/O processor corresponding to the mode specified in the file access instruction (any of the buffered I/O processor, the direct I/O processor, and the extended I/O processor) in the OS causes the block device driver and the DMA driver to execute the file access corresponding to the instruction. At this time, each I/O processor specifies a physical address and a data length in the RAM, and the address in the hard disk drive identified by the file system (the address where a file is stored, acquired from the file system) for the DMA driver. Specifically, the extended I/O processor specifies a physical address in the non-OS management domain specified by the user process. The buffered I/O processor and the direct I/O processor each specify a physical address in the OS management domain converted from the virtual address specified by the user process.

The DMA driver causes the image processing circuit to execute the file access between the RAM and the hard disk drive in response to a request from the I/O processor.

As described above, according to the first embodiment, the extended I/O processor uses an area that is in the non-OS management domain in the RAM and that is specified with the physical address in the instruction from the user process to perform the file access to each file in the file system.

Accordingly, since the data area is specified with the physical address when the non-OS management domain is used in the file access, it is not necessary to perform the mapping of the virtual address for the non-OS management domain for every user process. Consequently, the load on the CPU caused by the use of the non-OS management domain in the file access is reduced.

In addition, according to the first embodiment, if a first mode (the buffered I/O mode or the direct I/O mode) is specified in the instruction from the user process, the buffered I/O processor and the direct I/O processor each use the OS management domain in the RAM to perform the file access to each file in the file system. If a second mode (the extended I/O mode) is specified in the instruction from the user process, the extended I/O processor uses the non-OS management domain in the RAM to perform the file access to each file in the file system.

As a result, it is possible to arbitrarily select the file access method (the second mode) using the non-OS management domain or the file access method (the first mode) using the OS management domain for one file in the user process.

2. Second Embodiment

An image forming apparatus according to a second embodiment of the present disclosure specifies an I/O processor charged with the file access to a file when the file is opened in the image forming apparatus according to the first embodiment.

Specifically, if the buffered I/O mode is specified in a file open instruction for a file from the user process, the buffered I/O processor is charged with reading from and writing into the file until the file is closed. If the direct I/O mode is specified in the file open instruction for a file from the user process, the direct I/O processor is charged with reading from and writing into the file until the file is closed.

If the extended I/O mode is specified in the file open instruction for a file from the user process, the extended I/O processor is charged with reading from and writing into the file until the file is closed.

For example, the user process specifies an I/O processor by using the value of, for example, an argument or a parameter in a common file open instruction.

The user process uses a read instruction and a write instruction common to the buffered I/O mode, the direct I/O mode, and the extended I/O mode and the I/O processor specified in the file open instruction and processes the read instruction and the write instruction.

The remaining configuration and operation in the image forming apparatus according to the second embodiment is the same as those in the image forming apparatus in the first embodiment.

As described above, according to the second embodiment, if the first mode (the buffered I/O mode or the direct I/O mode) is specified in the file open instruction for a file, the buffered I/O processor or the direct I/O processor is charged with reading from and writing into the file until the file is closed. If the second mode (the extended I/O mode) is specified in the file open instruction for a file, the extended I/O processor is charged with reading from and writing into the file until the file is closed.

As a result, it is possible to arbitrarily select the file access method (the second mode) using the non-OS management domain or the file access method (the first mode) using the OS management domain for every file in a single file system.

3. Third Embodiment

An image forming apparatus according to a third embodiment of the present disclosure does not specify an I/O processor when a file is opened, but instead specifies an I/O processor charged with the file access to the file when the file is read or written in the image forming apparatus according to the first embodiment.

In the third embodiment, the user process uses the file open instruction and the file close instruction common to the buffered I/O mode, the direct I/O mode, and the extended I/O mode and specifies an I/O processor in the read instruction or the write instruction. For example, the user process specifies an I/O processor by using the value of, for example, an argument or a parameter in a common read instruction or specifies an I/O processor in different read instructions (that is, functions having different function names). Similarly, for example, the user process specifies an I/O processor by using the value of, for example, an argument or a parameter in a common write instruction or specifies an I/O processor in different write instructions (that is, functions having different function names).

If the buffered I/O mode is specified in the read instruction or the write instruction for a file after the file is opened, the buffered I/O processor is charged with the reading corresponding to the read instruction or the writing corresponding to the write instruction. If the direct I/O mode is specified in the read instruction or the write instruction for a file after the file is opened, the direct I/O processor is charged with the reading corresponding to the read instruction or the writing corresponding to the write instruction.

If the extended I/O mode is specified in the read instruction or the write instruction for a file after the file is opened, the extended I/O processor is charged with the reading corresponding to the read instruction or the writing corresponding to the write instruction.

In addition, in the third embodiment, both the file access in the buffered I/O mode and the file access in the extended I/O mode may exist from the time when a file is opened to the time when the file is closed. Accordingly, in order to ensure the consistency of data, the extended I/O processor causes the buffered I/O processor to process data in the file, remaining in the buffer in the OS management domain, and executes the reading corresponding to the read instruction for the file or the writing corresponding to the write instruction for the file when no data remains in the buffer.

The remaining configuration and operation in the image forming apparatus according to the third embodiment is the same as those in the image forming apparatus in the first embodiment.

As described above, according to the third embodiment, if the first mode (the buffered I/O mode or the direct I/O mode) is specified in the read instruction or the write instruction for a file, the buffered I/O processor or the direct I/O processor is charged with the reading corresponding to the read instruction or the writing corresponding to the write instruction. If the second mode (the extended I/O mode) is specified in the read instruction or the write instruction for a file, the extended I/O processor is charged with the reading corresponding to the read instruction or the writing corresponding to the write instruction.

As a result, it is possible to arbitrarily select the file access method (the second mode) using the non-OS management domain or the file access method (the first mode) using the OS management domain for every read instruction and for every write instruction. Accordingly, it is possible to differentiate the file access method used in the read instruction for a file from that used in the write instruction for the file.

In addition, the consistency of data is ensured even if both the read instruction and/or the write instruction by the file access method using the non-OS management domain and the read instruction and/or the write instruction by the file access method using the OS management domain, which is normally used, exit for one file.

4. Fourth Embodiment

Figure 5:
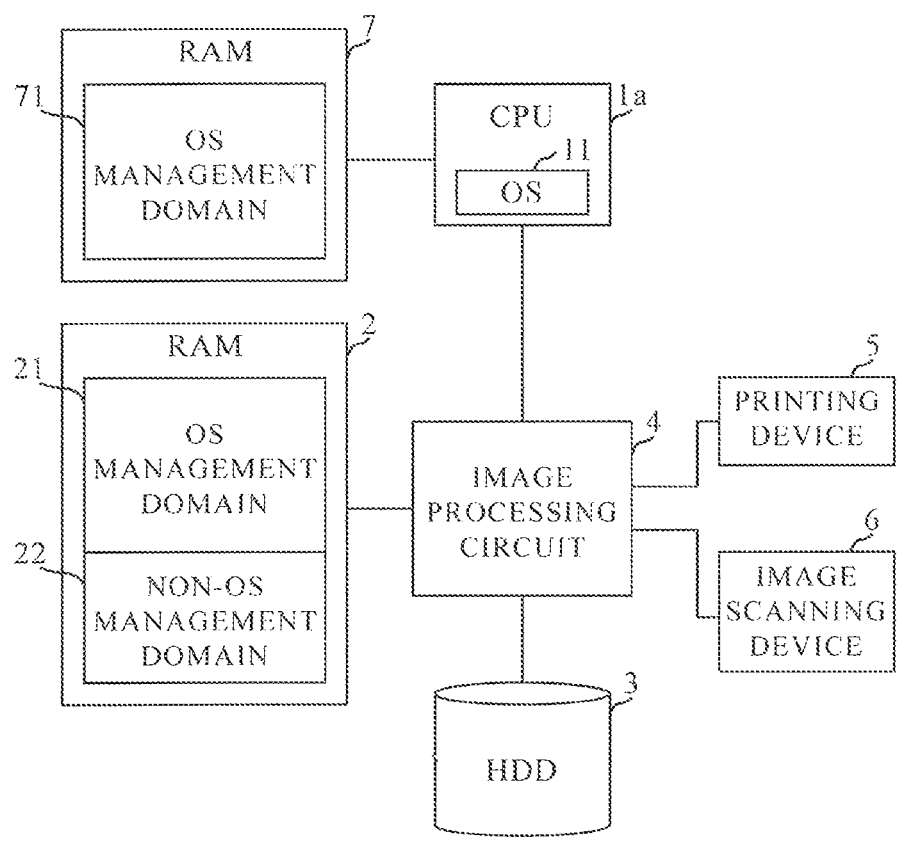
FIG. 5 shows an example configuration of an image forming apparatus according to a fourth embodiment of the present disclosure.

FIG. 5 shows an example of the configuration of an image forming apparatus according to a fourth embodiment of the present disclosure.

In the fourth embodiment, CPU 1*a* includes a memory controller and the image forming apparatus includes RAM 7 directly connected to CPU 1*a*. RAM 7 serves as a main storage unit similar to RAM 2 of the image forming apparatus according to the first embodiment shown in FIG. 1. OS management domain 71 is ensured in RAM 7 and data concerning kernel processing in OS 11 is stored in OS management domain 71. Accordingly, buffer 21*a* in the buffered I/O mode is provided in OS management domain 71 in the fourth embodiment. In addition, in the fourth embodiment, data including the image data processed by image processing circuit 4 is stored in OS management domain 21 and non-OS management domain 22 in RAM 2 connected to image processing circuit 4.

The remaining configuration and operation in the image forming apparatus according to the fourth embodiment is the same as those in the image forming apparatus described in any of the first to third embodiments.

Although the hard disk drive is used as the auxiliary storage unit in the above embodiments, another block device, such as a solid state drive (SSD), may be used instead of the hard disk drive.

The direct I/O processor may be omitted in the above embodiments.

The present disclosure is applicable to an image forming apparatus, such as a printer, a scanner, a copier, a facsimile machine, or a multifunction peripheral.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
a main storage unit;
an auxiliary storage unit; and
a processor that executes a file access program, wherein when the processor executes the file access program, the processor performs:
managing a file stored in the auxiliary storage unit;
an extended input-output processing that specifies a first area with a physical address specified in an instruction from a user process and uses the first area in the main storage unit to perform file access to a file, the first area being in a storage area that is not managed by an operating system;
a buffered input-output processing that converts from a virtual address specified in an instruction from a user process to a converted physical address, specifies a second area with the converted physical address, and uses the second area in the main storage unit to indirectly perform, via a buffer, the file access to the file, the second area being in a storage area that is managed by the operating system; and
a direct input-output processing that converts from the virtual address specified in an instruction from a user process to the converted physical address, specifies the second area with the converted physical address, and uses the second area in the main storage unit to directly perform the file access to the file,
wherein the file access by the extended input-output processing has priority over the file access by each of the buffered input-output processing and the direct input-output processing if the file access by the extended input-output processing is performed concurrently with at least one of the buffered input-output processing and the direct input-output processing.

2. The image forming apparatus according to claim 1, wherein, when the file access is performed by a particular input-output processing from among the extended input-output processing, the buffered input-output processing, and the direct input-output processing, the particular input-output processing being specified in a file open instruction for the file, the processor performs reading from and writing into the file until the file is closed.

3. The image forming apparatus according to claim 1, wherein, when the file access is performed by a particular input-output processing from among the extended input-output processing, the buffered input-output processing, and the direct input-output processing, the particular input-output processing being specified in a read instruction or a write instruction for a specific file, the processor performs reading corresponding to the read instruction or writing, corresponding to the write instruction.

4. The image forming apparatus according to claim 3,
wherein, when no data corresponding to the specific file remains in a buffer in a buffered I/O mode, and when the particular input-output processing specified in the read instruction or the write instruction corresponding to the specific file is the extended input-output processing, the processor executes the reading corresponding to the read instruction or the writing corresponding to the write instruction by the extended input-output processing.

5. The image forming apparatus according to claim 1,
wherein at least one of image data and image attribute data is stored in the file,
wherein when performing the extended input-output processing, the processor performs the file access for the image data, and
wherein when performing the buffered input-output processing or the direct input-output processing, the processor performs the file access for the image attribute data.

6. The image forming apparatus according to claim 5, further comprising:
an image processing circuit connected to the main storage unit,
wherein the image data is used in image processing performed by the image processing circuit or acquired as a result of the image processing performed by the image processing circuit, and
wherein when performing the extended input-output processing, the buffered input-output processing, and the direct input-output processing, the processor causes the image processing circuit to execute reading and writing.

7. A non-transitory computer-readable recording medium storing a file access program executable by a computer in an image forming apparatus, the file access program comprising:
first program code that when executed by the computer causes the computer to manage a file stored in an auxiliary storage unit;
second program code that when executed by the computer causes the computer to specify a first area with a physical address specified in an instruction from a user process and use the first area in a main storage unit to perform file access to a file, the first area being in a storage area that is not managed by an operating system;
a third program code that when executed by the computer causes the computer to convert from a virtual address specified in an instruction from a user process to a converted physical address, specify a second area with the converted physical address, and use the second area in the main storage unit to indirectly perform, via a buffer, the file access to the file, the second area being in a storage area that is managed by the operating system; and
a fourth program code that when executed by the computer causes the computer to convert from the virtual address specified in an instruction from a user process to the converted physical address, specify the second area with the converted physical address, and use the second area in the main storage unit to directly perform the file access to the file,
wherein the file access by the second program code has priority over the file access by each of the third program code and the fourth program code if the file access by the second program code is performed concurrently with at least one of the third program code and the fourth program code.

8. The image forming apparatus of claim 1, further comprising an image processing circuit connected to the main storage unit,
wherein the main storage unit includes (i) a first main storage unit comprising a third area that is managed by the operating system, and (ii) a second main storage unit comprising a fourth area that is managed by the operating system and a fifth area that is not managed by the operating system,
wherein the buffer is provided for use by the buffered input-output processing in the third area,
wherein data associated with kernel processing is stored in the third area,
wherein image data processed by the image processing circuit is stored in the fourth area and the fifth area,
wherein the first main storage unit is connected to a processor, wherein the processor comprises the extended input-output processing, the buffered input-output processing, and the direct input-output processing, and
wherein the second main storage unit is connected to the image processing circuit.

* * * * *